April 12, 1966        J. R. WILCOX        3,245,477
PLOW DEPTH CONTROL AND MEANS FOR IMPROVING TRACTOR TRACTION
Filed July 24, 1961        2 Sheets-Sheet 1
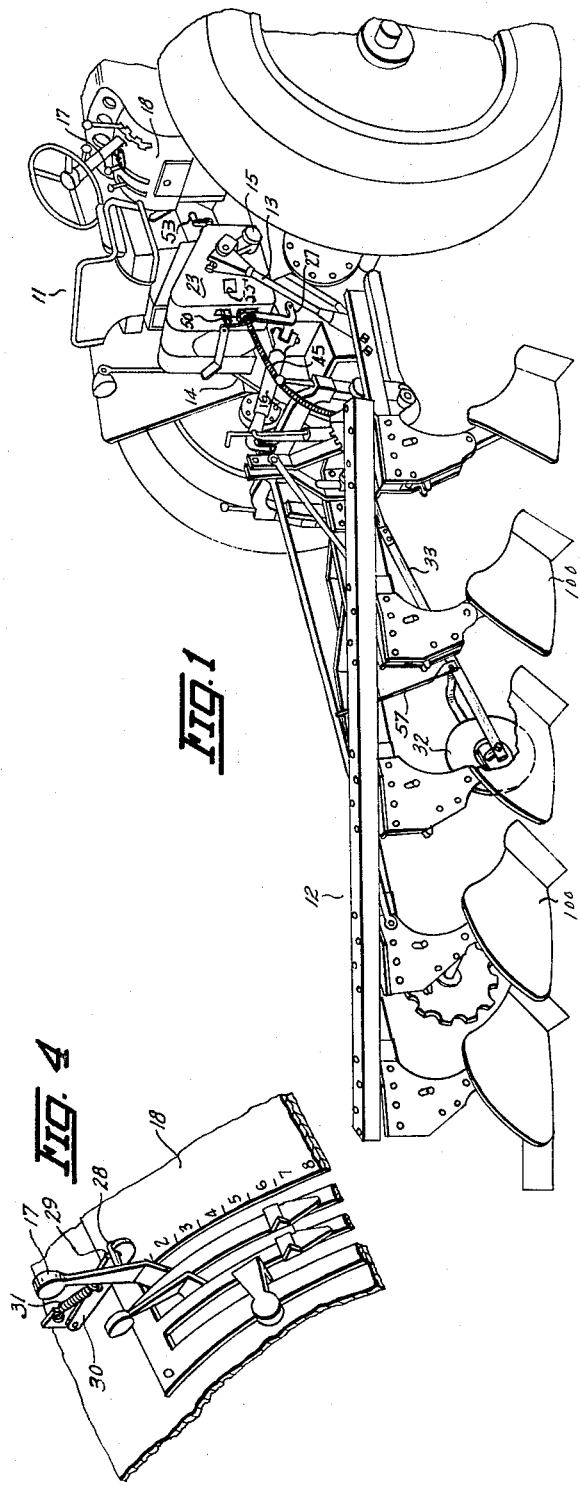
INVENTOR.
JAMES RUSSELL WILCOX
BY *Ray Bailey*
ATTORNEY.

April 12, 1966    J. R. WILCOX    3,245,477
PLOW DEPTH CONTROL AND MEANS FOR IMPROVING TRACTOR TRACTION
Filed July 24, 1961    2 Sheets-Sheet 2
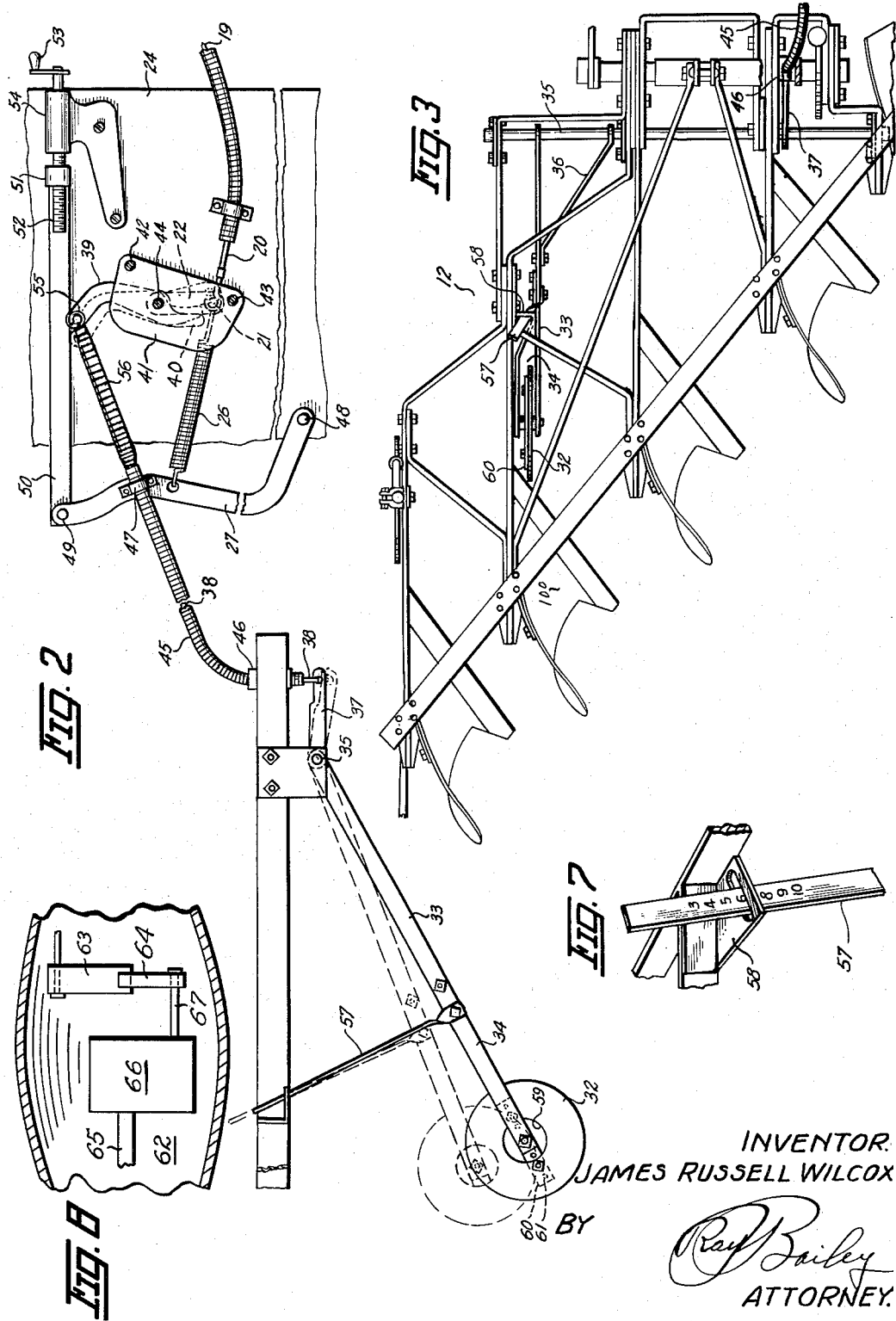
INVENTOR.
JAMES RUSSELL WILCOX
BY
Ray Bailey
ATTORNEY.

United States Patent Office 3,245,477
Patented Apr. 12, 1966

3,245,477
PLOW DEPTH CONTROL AND MEANS FOR
IMPROVING TRACTOR TRACTION
James Russell Wilcox, Jewell, Iowa, assignor of one-third
to Ray V. Bailey, Clarion, Ohio
Filed July 24, 1961, Ser. No. 126,264
5 Claims. (Cl. 172—4)

This invention relates to prime movers and to implements impelled thereby and is deemed to have ideal application in a combination comprising a farm tractor and a moldboard type plow. It is not, of course, limited to such combination.

It is common knowledge that one of the most power-consuming tasks to be performed on a farm is that of breaking up or plowing the soil preparatory to planting a crop. With the advent of the farm tractor it was only logical that it should be hitched to the moldboard plow for this difficult undertaking. Subsequent improvements have included the provision of a hydraulic system on the farm tractor which is capable of raising and otherwise manipulating implements propelled by the tractor and which is also capable of manipulating parts of the implements themselves.

Plows which are currently used with farm tractors fall into two principle catagories namely, those which are trailed behind the tractor, having supporting wheels of their own, and those which are mounted upon the tractor, the latter being primarily or entirely reliant upon the tractor for their support.

It is to the so-called mounted type plow that my invention has, perhaps, the greatest application inasmuch as regulation of plowing depth is somewhat more of a problem with a mounted plow than with a trailed plow. However, it may be used with either.

As is well known to those familiar with moldboard plows, the tendency of these plows is to pull themselves deeper and deeper into the ground as forward motion progresses with the result that some means of limiting the extent to which they pull themselves into the ground is necessary in such plows. The supporting wheels of a trailed type plow and the framework connected thereto serve to assist in regulating the depth to which its plow bottoms are permitted to bury themselves. In a mounted plow such regulation is provided to a substantial extent by the wheels of the tractor, the hydraulic system of the tractor being used to hold the plow at a predetermined elevation, to raise the plow with reference to the tractor, and to regulate its lowering with reference thereto.

It is an object of this invention to provide mechanism for use with a plow or other type of equipment which is adapted to regulate the depth at which an operable member of said equipment functions.

Another object of this invention is to provide mechanism for use with a plow or other type of equipment which mechanism has a member adapted to travel along a guide surface for the purpose of gauging and assisting in regulating the depth at which an operable member of said equipment functions.

A further object of this invention is to provide means for increasing the traction of a prime mover.

Yet another object of this invention is to provide mechanism for intermittently increasing the pressure on the drive wheels of a prime mover whereby the effective traction of said prime mover is increased.

A still further object of this invention is to provide for as assembly comprising a prime mover and an operable member impelled thereby, mechanism for regulating the depth at which said operable member functions, an effect of said mechanism being to increase the pressure on the drive wheels of said prime mover when the depth of said operable member is being reduced.

An additional object of this invention is to provide for the combination comprising a farm tractor and a moldboard type plow impelled thereby, a mechanism adapted to automatically raise the plow bottoms as they go beyond a pre-determined depth, an additional effect of such mechanism being to increase the traction of the drive wheels of said tractor by intermittently increasing the pressure on said drive wheels.

Other objects of this invention will become apparent from a perusal of the ensuing disclosure and claims.

Basically, in its preferred form, my invention contemplates a farm tractor with a moldboard type plow mounted thereon, this assembly being provided with a hydraulic system for selectively raising the plow to a position such that it is supported by the tractor. To such an assembly I preferably add a member adapted to travel in contact with the undisturbed surface of the ground, connections being provided between said ground following member and said hydraulic system whereby, as the plow bottoms tend, due to any of a number of causes, to go further beneath the surface of the ground than the depth which has been predetermined as desired, said ground following member signals the hydraulic system to raise the plow bottoms somewhat. The effect of this operation is to not only, within allowable tolerances, maintain the plow bottoms at a desired pre-determined depth but also to intermittently increase the pressure on the drive wheels of the tractor whereby the traction of said drive wheels is improved.

In order that a clearer understanding of my invention may be had, reference is made to the accompanying drawings which form a part of this specification and in which FIG. 1 is a fragmentary perspective view of a tractor and plow assembly into which one embodiment of my invention has been incorporated.

FIG. 2 is an enlarged fragmentary side elevation of the principle parts of the embodiment of my invention incorporated in FIG. 1.

FIG. 3 is a plan view of the plow portion of the assembly shown in FIG. 1, the parts of my invention being drawn in somewhat heavier lines than the plow itself.

FIG. 4 is an enlarged perspective view of a portion of the dash of the tractor and details a feature of the embodiment of my invention herein disclosed which is not shown in FIG. 2.

FIG. 5 is a detailed perspective view of the ground following member employed in this embodiment of my invention together with some associated parts.

FIG. 6 is a fragmentary perspective view of parts associated with the tractor adjacent its hydraulic system control lever and contemplates that the viewer is looking outwardly from the tractor housing into which the shaft of said control lever enters.

FIG. 7 is a fragmentary perspective view showing details of the depth gauge which is associated with the ground following member of FIG. 5.

FIG. 8 is a fragmentary view, partially in cross section and partially in rear elevation showing another embodiment of the means for increasing the traction of a prime mover.

Referring now to the drawings in greater detail reference character 11 has been employed to designate a tractor upon which a moldboard type plow 12 has been mounted. Lift arms 13 and 14, which connect at their upper ends to the rockshaft 15 of the hydraulic system of the tractor, serve to selectively raise plow 12 completely off the ground thus placing its entire weight upon the tractor. Center link 16, by preventing rearward tipping, serves to insure the raising of the rear end of the plow when the forward end is raised by lift arms 13 and 14.

On the particular tractor to which my invention has been applied, a control lever 17 is provided on the dash 18 for selectively causing rockshaft 15 to raise lift arms 13 and 14. The effect is produced by connecting means, including a flexible cable 19 (FIG. 2), rod 20 (FIGS. 2 and 6), and stud 21, which connecting means operatively attaches lever 17 to lever 22. Lever 22 is disposed beneath the shield 23 (FIGS. 1 and 6) but outside of hydraulic system housing 24 (FIG. 2) of the tractor and is operatively connected by shaft 25 to the hydraulic system of the tractor. Forward movement of lever 17 causes corresponding forward movement of lever 22. Such forward movement of lever 22 causes rockshaft 15 to rotate in a clockwise direction, raising lift arms 13 and 14 and hence plow 12.

In order to adapt the foregoing assembly to my invention as here described, I have installed a spring 26 which has one end attached to the stud 21 of lever 22 and which has its other end attached to any suitable mount such as housing 24 or the lever 27, as shown in FIG. 2. It will be apparent that inclusion of spring 26 as described serves to bias lever 22 in a normally rearward position and it will be apparent from this fact and from what has been said heretofore that spring 26 normally insures that the plow 12 is resting with its full weight upon the ground and there is no tendency for the hydraulic system to lift it. In fact when lever 22 is in its hindmost position the bottom of the plow would, except for support provided by the ground, be permitted to drop a substantial distance below the ground level and it, of course, actually does so when the plowing operation is commenced. In order to selectively overcome the effect of spring 26 so that plow 12 may be permanently held in raised position while being transported or the like, catch means may be provided on the dash 18 for holding lever 17 and lever 22 in forward positions against the action of spring 26. Such a catch means has been shown in FIG. 4 where a pin 28, secured to lever 17, is received in the cut-out 29 of keeper 30, a spring 31 being provided to normally retain said keeper 30 in operative engagement with pin 28. As is apparent from the illustration, the arrangement of the parts is such that when pin 28 is received in cut-out 29, lever 17 is in a forward position. To return the plow to lowered position and the hydraulic mechanism to the control of spring 26, the operator simply releases keeper 30 from engagement with pin 28 permitting lever 17 to be drawn to a lowered position.

In the embodiment of my invention herein portrayed for illustrative purposes, I have employed a wheel 32 as the ground following member. A bar 33 provided at its lower end with a fork 34 for engagement with wheel 32 is provided for operatively connecting wheel 32 with rotatable shaft 35. The upper end of said bar 33 is locked to rotatable shaft 35 and a brace member 36 is provided for purposes of stabilization. Also keyed to shaft 35 is arm or lever 37. Since lever 37 projects from shaft 35 in a generally opposite direction to that in which bar 33 projects, it is apparent that upward movement of ground wheel 32 will cause downward movement of the extended end of arm 37.

Attached to the extended end of arm 37 is one end of a flexible cable 38, the other end of which is attached to the upper end of a lever 39, which lever 39 has its lower end 40 in operative engagement with lever 22 of the tractor hydraulic system. To support lever 39 in the desired position, I have provided a mounting plate 41 which is spaced from housing 24 but secured thereto at 42 and 43. Lever 39 is pivotally attached to the inside of said plate 41 at 44 and the arrangement of parts is preferably such that pivot point 44 is in substantial alignment with hydraulic system shaft 25. As will be clear from the description thus far, upward movement of ground wheel 32 causes forward movement of the lower end 40 of lever 39 and hence forward movement of lever 22 of the hydraulic system with the accompanying tendency to cause the hydraulic system to raise the plow somewhat. It will also be apparent that, with the ground following wheel 32 travelling upon unplowed surface, any movement of the plow bottoms 100 deeper into the ground, whether due to an irregularity in the surface of the ground or to other causes, will have the same effect as would raising of the ground wheel 32 so that, when the plow bottoms 100 tend to move further below the surface of the ground, the hydraulic system is signalled to raise them.

In order to provide means for regulating the depth to which the plow will operate without being raised, in other words, in order to "set" the depth at which it is desired to plow and at which my automatic control will commence to function, I have provided a sheath or casing 45 for flexible cable 38, the lower end of which casing is immovably secured in a mount 46, above the extended end of arm 37, and the upper end of which casing 45 is fixed to lever 27 at 47. It will be noted that the lower end of lever 27 is pivotally attached at 48 to housing 24 and that at its upper end lever 27 is pivotally attached at 49 to bar 50. The remote end of bar 50 is supplied with a nut 51 adapted to cooperate with the threaded portion of shaft 52. On the extended end of shaft 52 a crank 53 is provided and intermediate the crank and its threaded portion said shaft 52 is rotatably received in journal box 54 which is mounted on housing 24. Thus it is seen that rotation of crank 53 provides means of regulating the position of the upper end of casing 45 with corresponding adjustment of the position of the lever 39 and hence of lever 22 and it will be further apparent that thus adjusting the position of lever 22 establishes the depth at which my control commences to operate since, when the plow bottoms 100 reach the depth thus established, the condition of the linkage will be such that any further deepening will cause ground wheel 32, through bar 33, shaft 35, arm 37, cable 38 and lever 39 to move lever 22 forward slightly, causing the hydraulic system to raise the plow somewhat.

Since it is desirable that the connection of the upper end of cable 38 to lever 39 be in the nature of a selectively disengageable hook 55 in order that the plow may be readily disconnected from the tractor, I have found it expedient to provide a compression spring 56 on the upper end of cable 38, above the upper end of casing 45, to avoid accidental disengagement of said hook 55. Spring 56 accomplishes this effect by maintaining tension on the cable 38 even when ground wheel 32 is lowered and/or when lever 22 is being operated by manual dash lever 17. Spring 56 also functions to hold hook 55 in line with access opening 55' in shield 23 when said hook 55 is being disengaged as a step in disconnecting the plow from the tractor.

As a means of indicating to the operator the depth at which he has set crank 53 and at which he is plowing, I have provided a gauge member 57 which is calibrated in inches and which is mounted upon connecting bar 33 of ground wheel 32. A slotted bracket 58 is mounted upon the framework of the plow and slidably receives the upper end of said gauge member 57, the edge of the slot serving to designate the depth as well as to function as a guide.

The foregoing points up in detail the aspect of my invention which comprises providing means for accurately controlling the plowing depth. An almost equally important function of my invention is the provision of decidedly improved traction in the prime mover.

As my improved tractor-plow assembly illustrated herein proceeds across a field with the plow being raised from time to time as a result of the action of my control device, the pressure on the drive wheels of the tractor is correspondingly increased with the additional result that the traction of said drive wheels is decidedly improved and their tendency toward slippage is reduced.

While the natural performance of my device as described provides a substantial improvement in traction, I have found that the tractor's traction can be improved still further by employing an eccentric ground wheel which serves to briefly actuate the hydraulic system during each rotation of said ground wheel with the effect that the pressure on the tractor's drive wheels is momentarily increased at brief, regular intervals. In FIGS. 2 and 5 it will be seen that the ground wheel 32 has been provided with an enlarged hub opening 59 together with a hub bearing strap 60 which has a plurality of sets of holes 61 for attachment to wheel 32. By employing one set of holes for attaching the hub to the wheel, a concentric mount can be obtained, by employing another set, an eccentric mount will be provided. The device as illustrated can accordingly be employed with only its natural traction improvement which is adequate under certain field conditions or it can be employed with magnified traction improvement if field conditions warrant such usage.

The significance of my invention to agriculture is believed to be apparent. While not all soils should be plowed to the same depth and while not all farmers are of the same opinion regarding the proper depth for plowing, the desirability of plowing a given field at a substantially uniform depth is generally accepted. My invention insures that such will be done automatically without constant and tedious efforts by the farmer. In field comparison tests a tractor and mounted plow equipped with my control device was able to plow at a substantially uniform depth of six inches whereas generally similar equipment without my device had difficulty maintaining a uniform depth in the ground being worked and tended rather to go much deeper or much more shallow. Similarly, the improvement which my invention provides in the traction of tractors is highly important. Not only does it materially reduce the chances of becoming stalled but it reduces the inefficiency and waste involved in the slippage of drive wheels. In the field comparison tests the assembly equipped with my device was able to plow deeper, with less slippage while carrying approximately twenty-five hundred pounds less weight.

Although I have found my invention to be particularly applicable to a moldboard type plow, it may be used with various other non-farm and farm equipment including field cultivators and various tool bar mounted implements. Moreover it may be used with self-propelled equipment as well as with mounted implements and with trailed implements.

With reference to the exact form of my device, this can, as heretofore indicated, be widely varied. The ground following member may, for example, be any suitable device including a runner, which has been used very successfully, and its connections to the lift system may be of any suitable nature, whether mechanical or otherwise. Similarly the lift system itself need not be of the hydraulic type but may be of any suitable nature. In fact my device may be adapted to control a system in which downward as well as upward pressure is available for controlling operable members. That the depth gauge, the dash lever catch, the means for manually controlling the lift system, the means for normally biasing the lift system in one position, the assembly for setting the depth at which my device will commence to function and other details may be of any suitable construction or may be eliminated is, of course, obvious.

While I have indicated that in my preferred embodiment and usage the ground following member preferably travels along unplowed surface of the ground, the surface along which the follower travels depends, of course, upon the type of equipment on which my invention is being used and upon the objectives involved.

With reference to other constructions for accomplishing the function of increasing traction, a wide variety of devices may be employed for intermittently actuating the lifting mechanism and any suitable mass may replace the plow as the weight to be lifted. For example the eccentric groundwheel can be replaced by an assembly wholly contained within a housing of the lift mechanism. Such an assembly could consist of a semi-flexible arm disposed adjacent a lift system control lever and means for operatively connecting said arm to the gears of the drive mechanism of the prime mover whereby with each predetermined number of rotations of the drive mechanism the arm is caused to give the lift system control lever a momentary actuation. An assembly of this type is illustrated in FIG. 8 in which reference character 62 designates the housing of a lift mechanism the control lever 63 of which is capable of being momentarily actuated by the semi-flexible arm 64 with each predetermined number of rotations of the drive mechanism of the prime mover. The gears of said drive mechanism are operatively connected to said arm 64 through the shaft 65, gear box 66, and shaft 67 to which latter shaft said semi-flexible arm 64 is keyed.

It should be understood that it is my intention in the ensuing claims to cover all changes and modifications of the examples of my invention herein chosen for purposes of the disclosure, which do not constitute departures from the spirit and scope of the invention.

I claim:

1. For use with a tractor having a plow bottom associated therewith and having a power source adapted to regulate the elevation of said plow bottom, said power source including means for activating it, a device for automatically controlling the depth at which said plow bottom operates and for increasing the traction of said tractor comprising a wheel designed to travel in contact with the ground, a rotatable shaft mountable on structure associated with said plow, an arm locked to said rotatable shaft at one of its ends and rotatably and selectively eccentrically mounting said wheel at its other end, a second arm projecting from said rotatable shaft, a flexible member for connecting said second arm to the said activating means of the power source, a casing on a portion of said flexible member, means for adjusting the position of at least a part of said casing whereby adjustment of the position of said power source activating means can be effected, a calibrated member operatively connected to said wheel, and an indicating means operatively connected to said plow bottom and adapted to cooperate with said calibrated member to indicate the depth of said plow bottom beneath the surface of the ground.

2. For use with equipment having a member the elevation of which can be adjusted, having a power source adapted to selectively regulate the elevation of said member, having means for activating said power source including manually operable means and having means for yieldably biasing said power source activating means in one direction of its movement, an assembly for controlling the elevation of said elevation adjustable member comprising a movable member adapted to selectively move said power source activating means against its bias but incapable of being itself moved in a corresponding direction by said manually operable means, a ground following member, a flexible member connecting said ground following member to said movable member whereby the latter is at times caused to move said power source activating means to regulate the elevation of said elevation adjustable member, a casing on a portion of said flexible member and means for minutely adjusting the position of at least a portion of said casing whereby the position of the ground following member which will result in regulation of the elevation of the elevation adjustable member, for a given position of said latter member, can be varied and accurately set.

3. For use with equipment having a member the elevation of which can be adjusted, having a power source adapted to selectively regulate the elevation of said member, having means for activating said power source including manually operable means and having means for yieldably biasing said power source activating means in one direction of its movement, an assembly for controlling the elevation of said elevation adjustable member comprising a movable member adapted to selectively move said power source activating means against its bias but incapable of being itself moved in a corresponding direction by said manually operable means, a ground following member, means connecting said ground following member to said movable member whereby the latter is at times caused to move said power source activating means to regulate the elevation of said elevation adjustable member, and means for adjusting the position of said movable member whereby the position of the ground following member which will result in regulation of the elevation of the elevation adjustable member, for a given position of said latter member, can be varied.

4. A combination for improving the traction of a prime mover comprising a power lift system installed on said prime mover, a tool frame carried by said lift system, an earth working tool carried by the tool frame and adapted to be lifted by said lift system whereby the weight of the tool is primarily borne by said prime mover during at least a part of a lifting operation, said tool being at times at least partially otherwise supported, and a freely rotatable, eccentric ground follower means carried by the tool frame, means interconnecting the ground follower means with said power lift system to effect control of the elevation of the tool frame by adjustment of the lift system, said follower means acting through said interconnecting means to cause said lift system to partially raise the tool intermittently, whereby additional weight is placed on said prime mover at regular, predetermined intervals, the arrangement being such that said tool weight is normally at least partially otherwise supported at the inception of the application of said lifting force.

5. The invention according to claim 4, wherein said ground follower means comprises a wheel with an eccentric hub.

References Cited by the Examiner

UNITED STATES PATENTS

| | | | |
|---|---|---|---|
| 637,939 | 11/1899 | Murray | 33—185 |
| 1,064,585 | 6/1913 | Yoder | 172—90 |
| 2,023,053 | 12/1935 | Kugel | 172—430 |
| 2,318,194 | 5/1943 | Brown | 172—4 |
| 2,527,840 | 10/1950 | Mott | 172—4 |
| 2,616,350 | 11/1952 | Robinson et al. | 172—4 |
| 2,654,339 | 10/1953 | Sperling | 116—124 |
| 2,700,828 | 2/1955 | Barns | 33—185 |
| 2,722,793 | 11/1955 | Nelson | 172—90 |
| 2,804,814 | 9/1957 | Czarnocki | 172—7 |
| 2,898,687 | 8/1959 | Broecker | 172—430 X |
| 3,045,355 | 7/1962 | Woods | 33—185.5 |

FOREIGN PATENTS

| | | |
|---|---|---|
| 772,371 | 4/1957 | Great Britain. |
| 455,200 | 2/1950 | Italy. |
| 576,105 | 4/1958 | Italy. |
| 75,905 | 11/1949 | Norway. |

ABRAHAM G. STONE, *Primary Examiner.*

T. GRAHAM CRAVER, *Examiner.*